March 8, 1960 P. J. CORSO 2,927,351
OUTDOOR MOTION PICTURE PROJECTION APPARATUS
Original Filed Oct. 6, 1950
2 Sheets-Sheet 1

INVENTOR.
PHILIP J. CORSO
BY
Church + Church
ATTORNEYS

March 8, 1960 P. J. CORSO 2,927,351
OUTDOOR MOTION PICTURE PROJECTION APPARATUS
Original Filed Oct. 6, 1950 2 Sheets-Sheet 2
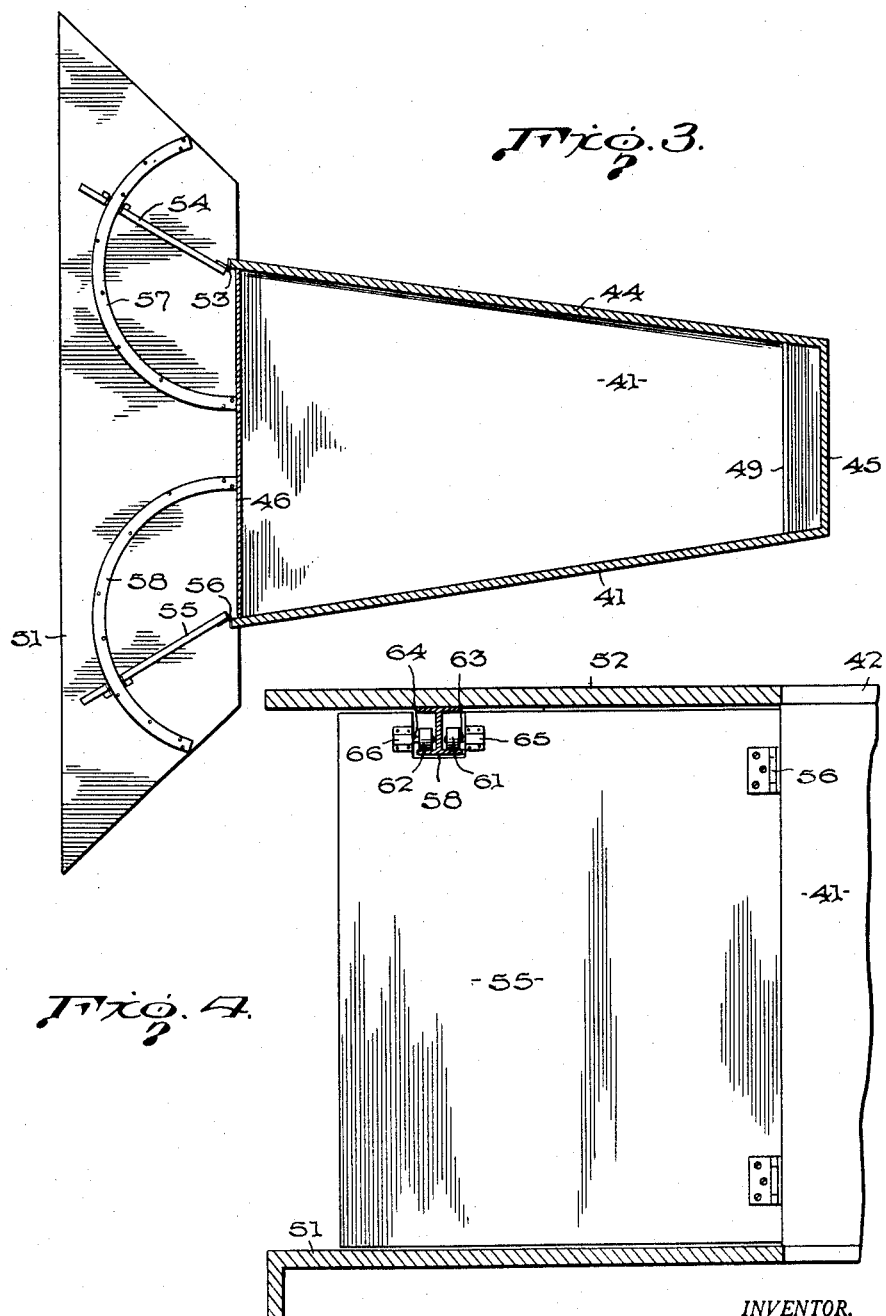
INVENTOR.
PHILIP J. CORSO
BY
Church & Church
ATTORNEYS United States Patent Office 2,927,351
Patented Mar. 8, 1960

2,927,351

OUTDOOR MOTION PICTURE PROJECTION APPARATUS

Philip J. Corso, Arlington, Va.

Original application October 6, 1950, Serial No. 188,783, now Patent No. 2,742,816, dated April 24, 1956. Divided and this application January 13, 1956, Serial No. 558,959

1 Claim. (Cl. 20—1.12)

This invention relates to picture projection apparatus and particularly concerns outdoor motion picture projection apparatus which may be used in varying conditions of external light.

This is a division of my co-pending application Serial No. 188,783, filed October 6, 1950, now Patent No. 2,742,816, for Picture Projection Apparatus.

In an outdoor theater, a projection screen directly exposed to daylight cannot produce a distinct image because the daylight eliminates the shadows which define the image projected on the screen. With the improved efficiency of a translucent screen embodying the invention disclosed in my co-pending application Serial No. 188,783, now Patent No. 2,742,816, a greater external light is permissible.

A major object of the invention is to provide outdoor picture projection apparatus with an adjustable light shield so the exposure of the screen may be reduced during daylight hours without curtailing the theater capacity after dark.

In the attainment of this object, an important feature of the invention resides in the arrangement of a light shield with its top and bottom extending horizontally outwardly from the top and bottom of the screen and extending laterally beyond the sides of the screen with side walls of the same height as the screen hinged to the side of the screen so they may swing to different oblique angles relative to the screen and thereby vary the exposure of the screen to external light and at the same time vary the field of view.

Another feature resides in the arrangement of forwardly diverging side shields spaced from the sides of the screen.

Still another feature resides in the arrangement of a light-tight housing with rearwardly diverging walls, the screen closing the upper portion of the front of the housing and a front wall closing the remainder of the front; a projector being positioned below the bottom of the light shield to project through the front wall rearwardly onto a reflector at the rear of the housing.

Other objects and features of the invention will become apparent from the following specification taken in conjunction with the accompanying drawings wherein:

Fig. 3 is a horizontal sectional view of the apparatus shown in Figs. 1 and 2; and Fig. 4 is a fragmentary sectional view of one of the pivoted side shields showing the guide rails therefor.

Figure 1:
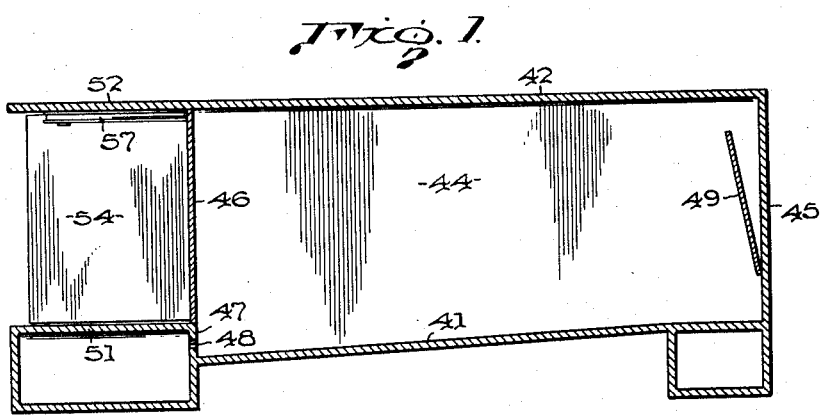
Fig. 1 is a longitudinal vertical sectional view of outdoor motion picture apparatus embodying the invention.
Figure 2:
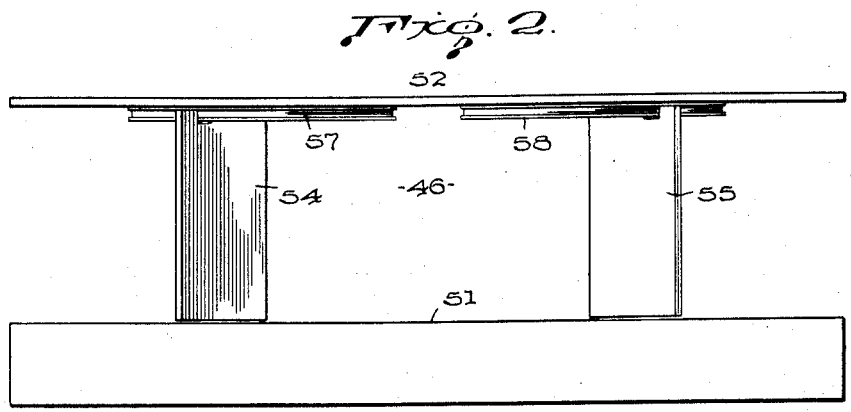
Fig. 2 is a front elevational view of the apparatus shown in Fig. 1.

As shown in the drawings, this apparatus has a light-tight housing of rectangular cross-section formed by rearwardly converging floor 41 and roof 42 with rearwardly converging side walls 43 and 44. The smaller end of this light-tight housing is closed by a rear wall 45. The upper portion of the front end of the light-tight housing is closed by translucent screen 46 embodying the invention disclosed in my aforementioned application Serial No. 188,783, now Patent No. 2,742,816. The lower portion of the front end of the housing is closed by a front wall 47. This wall 47 is provided with an aperture 48 through which rays from a projector (not shown) may be directed rearwardly through the light-tight housing onto a reflector 49 at the rear of the housing from which the rays are reflected onto the rear of the screen 46. The screen 46 has its outer face protected by a light shield. This light shield is composed of a bottom 51 extending upwardly from the bottom edge of the screen 46 and the top edge of the front wall 47. This bottom 51 extends laterally beyond the sides of the screen 46. The top 52 of the light shield extends horizontally forwardly from the top of the screen 46 and extends laterally beyond the sides of the screen 46 in the same manner as the bottom 51. Hinged to one side of the screen 46 as by hinges 53, 53, is a door 54 of the same height as the screen and of a width corresponding to half the width of the screen. A similar door 55 is hinged at 56, 56, to the other side of the screen. If desired, to support the weight of these doors for free movement, arcuate rails 57 and 58 may be suspended from the top 52 of the light-tight housing in the manner shown in Fig. 4. As there illustrated, the rail 58 is of I-beam formation and the door 55 is cut out at its upper end to accommodate the rail. Rollers 61 and 62 are carried by shafts 63 and 64 supported on the door 55 by brackets 65 and 66.

With this compact arrangement, pictures are directed from the projection booth below the bottom 51 of the light shield through aperture 48 in the front wall 47 onto the reflector 49 and then onto the rear of the translucent screen 46. During daylight hours, the doors 54 and 55 are arranged at a relatively small oblique angle with respect to the screen 46. During the evening and into the night, the angular position of the doors may be increased as a necessity for shading the screen decreases. In this way the capacity of the theater is increased, because with the improved screen of this invention, the lack of distortion permits satisfactory viewing of the screen from a side position. Thus, during daylight hours, the exposure of the screen is reduced, whereas, as darkness descends, the exposure of the screen and capacity of the theater are increased by gradually swinging the doors outwardly to greater oblique angles with respect to the screen. When the picture projection apparatus is not in use the doors may be closed over the screen to protect the screen.

While the foregoing description and accompanying drawings relate to preferred embodiments of the invention, it is expected that these embodiments may be modified without departing from the invention so this specification and the drawings are intended to illustrate the invention but not to be interpreted in a restrictive manner.

What I claim is:

In outdoor motion picture projection apparatus, a translucent screen, a fixed horizontal hood wider than said screen extending forwardly from the top thereof, a fixed horizontal stage wider than said screen extending forwardly from the bottom thereof, a pair of doors of the same height as said screen extending from said stage to said hood, hinges at opposite sides of said screen supporting said doors on vertical axes, arcuate rails on said hood concentric with the hinge axes of said doors having horizontal flanges spaced beneath said hood, and rollers rotatably mounted at the tops of said doors resting on said flanges for supporting the free ends of said doors on said rails so said doors may be closed over the front of said screen and opened to different selected oblique angles relative to said screen.

References Cited in the file of this patent

UNITED STATES PATENTS

| 1,200,845 | Johnson | Oct. 10, 1916 |
| 2,134,123 | Hearn | Oct. 25, 1938 |
| 2,226,618 | Kuppenbender | Dec. 31, 1940 |
| 2,342,874 | Links et al. | Feb. 29, 1944 |
| 2,617,328 | Stableford | Nov. 11, 1952 |
| 2,651,234 | Corso et al. | Sept. 8, 1953 |

FOREIGN PATENTS

| 532,528 | France | Nov. 16, 1921 |